US008295996B2

(12) United States Patent
Botargues et al.

(10) Patent No.: US 8,295,996 B2
(45) Date of Patent: Oct. 23, 2012

(54) METHOD AND DEVICE FOR PREVENTING USELESS ALARMS GENERATED BY AN ANTI-COLLISION SYSTEM ON BOARD AN AIRPLANE

(75) Inventors: Paule Botargues, Toulouse (FR); Xavier Dal Santo, Blagnac (FR); Pierre Fabre, Tournefeuille (FR); Xavier Guery, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 525 days.

(21) Appl. No.: 12/563,661

(22) Filed: Sep. 21, 2009

(65) Prior Publication Data

US 2010/0076626 A1 Mar. 25, 2010

(30) Foreign Application Priority Data

Sep. 23, 2008 (FR) ...................................... 08 05212

(51) Int. Cl.
*G05D 1/00* (2006.01)

(52) U.S. Cl. ........... 701/5; 701/3; 701/8; 701/9; 701/14; 701/301; 244/180; 340/436

(58) Field of Classification Search .................. 701/3, 5, 701/8, 9, 11, 14, 301; 244/75.1, 180; 340/435, 340/436
See application file for complete search history.

(56) References Cited

U.S. PATENT DOCUMENTS

| | | | | |
|---|---|---|---|---|
| 6,433,729 | B1 * | 8/2002 | Staggs | 342/29 |
| 2003/0107499 | A1 * | 6/2003 | Lepere et al. | 340/945 |
| 2008/0021647 | A1 | 1/2008 | Daveze | |

FOREIGN PATENT DOCUMENTS

| | | |
|---|---|---|
| FR | 2 876 483 | 4/2006 |
| WO | 00/41153 | 7/2000 |

OTHER PUBLICATIONS

Preliminary Search Report dated May 15, 2009.

* cited by examiner

*Primary Examiner* — Gertrude Arthur Jeanglaude
(74) *Attorney, Agent, or Firm* — Dickinson Wright PLLC

(57) ABSTRACT

The invention describes a method and device for preventing useless alarms generated by an anticollision system on board an airplane and according to which the duration (dcap) of a phase of capture of a setpoint altitude (Zc) by the airplane is between a predetermined minimum execution deadline (dmin) and a predetermined maximum execution deadline (dmax).

10 Claims, 2 Drawing Sheets

METHOD AND DEVICE FOR PREVENTING USELESS ALARMS GENERATED BY AN ANTI-COLLISION SYSTEM ON BOARD AN AIRPLANE

FIELD OF THE INVENTION

The present invention relates to a method and a device for automatically preventing unnecessary alerts produced by the anticollision systems carried onboard airplanes, upon a change of altitude, as well as an airplane provided with such a device.

BACKGROUND OF THE INVENTION

It is known that most airliners are equipped with anticollision systems (generally called TCAS systems for Traffic Collision Avoidance Systems) which make it possible to ensure the safety of air traffic by preventing the risks of in-flight collision.

Thus, when two airplanes are converging towards one another, their anticollision systems calculate an estimate of the collision time and emit an alert informing the crews of each airplane of a possible future collision: such an alert is generally called a “traffic advisory” or “TA alert”. If appropriate, said anticollision systems emit moreover, for the attention of the crew, an order regarding an avoidance maneuver in the vertical plane so as to get out of the situation in which a collision is possible: such an avoidance maneuver order is generally called a “resolution advisory” or “RA alert”. The TA and RA alerts are manifested through voice messages and through the displaying of information in flight cabins.

In practice, an onboard anticollision system calculates a collision time in the horizontal plane (ratio of the horizontal distance of the two airplanes to their relative horizontal speed) and a collision time in the vertical plane (ratio of the vertical distance of the two airplanes to their relative vertical speed). Said collision times thus calculated are compared with predetermined thresholds for the TA alerts and for the RA alerts (said predetermined thresholds being moreover dependent on the altitude) and said alerts are triggered when said calculated collision times are less than the corresponding predetermined thresholds.

Moreover, it is known that frequently an airplane has to capture (while climbing or descending) a stabilized altitude level neighboring another altitude level allocated to another airplane and that, according to the rules of aerial navigation, two neighboring stabilized altitude levels are separated by only 300 m (1000 feet).

Hence, because of this small difference in altitude between stabilized altitude levels, the high vertical speed of modern airplanes and the weight of air traffic, said anticollision systems produce numerous TA and RA alerts, even though the airplane, shifting vertically so as to change altitude, is maneuvering correctly without any risk of collision with another airplane. These alerts induce a great deal of stress and are deemed operationally unnecessary by pilots, since the change-of-altitude maneuver is correct and their consideration leads to traffic disruption in most cases.

Moreover, the RA alerts during the altitude capture phases are very numerous and it is estimated that they currently represent more than 50% of the total of these alerts in European space, this percentage being apt to increase in the future owing to the expansion of air traffic.

SUMMARY OF THE INVENTION

The object of the present invention is to remedy this drawback.

To this end, by virtue of the invention, the method for limiting the number of alerts emitted by an anticollision system on board an airplane which performs a change-of-altitude maneuver comprising an approach phase followed by a phase of capture of a setpoint altitude associated with a predetermined setpoint execution deadline, said anticollision system being able to detect an intruder aircraft situated in the aerial environment of said airplane, to calculate a theoretical time for collision between said airplane and said intruder aircraft and to emit at least one alert when this theoretical collision time is less than a predetermined threshold, is noteworthy in that the following steps are carried out:

A)—a minimum execution deadline and a maximum execution deadline are determined for said capture phase, said minimum execution deadline being greater than said setpoint execution deadline;

B)—at least one modified vertical speed profile associated with said altitude capture phase is established so that the duration of the latter is between said minimum and maximum execution deadlines;

C)—when said airplane is in the approach phase and close to said setpoint altitude, said capture phase is triggered; and D)—after said capture phase is triggered, the vertical speed of said airplane is controlled so that it at least approximately follows said modified vertical speed profile.

In a customary manner, the setpoint execution deadline for the capture phase can be determined by the automatic pilot of the airplane.

Thus, by virtue of the invention, by lengthening in a limited manner the duration of the capture phase (which may not exceed the maximum execution deadline), the untimely triggering of at least some of the RA and/or TA alerts is prevented. Furthermore, the change-of-altitude maneuver is precluded from being too long, which might disturb the pilots of the airplane and also the air traffic surrounding the latter, for example by compelling other aircraft in proximity to it to perform a trajectory modification.

Furthermore, it is possible to calculate an engagement altitude level for said capture phase. Thus, said airplane can be considered to be close to said setpoint altitude when the current altitude level of said airplane is between said engagement altitude level and said setpoint altitude.

Preferably, said engagement altitude level is determined with the aid of the following formula:

$$Ze=a-(S_i+T)*Vzo$$

in which:

Vzo is the, substantially constant, vertical speed of said airplane in the course of said approach phase;

a is an adjustment parameter dependent on said minimum and maximum execution deadlines;

$S_i$ is said predetermined threshold; and

T is a positive temporal margin with respect to said predetermined threshold $S_i$.

Furthermore, in the course of said capture phase, said control of the vertical speed of said airplane can be performed by controlling the load factor of said airplane defined with the aid of the following formula:

$$nz=k*(Vz-f(Z))$$

in which:

nz is the load factor of said airplane in the course of said capture phase;

k is a negative constant dependent on the physical characteristics of said airplane;

Vz is the vertical speed of said airplane; and f represents a function describing said modified vertical speed profile as a function of the current altitude level Z of said airplane with respect to said setpoint altitude.

In the case where said setpoint altitude has not been reached after the expiry of said maximum execution deadline, said control of the vertical speed of said airplane can be performed by controlling the load factor of said airplane which is then defined by the following formula:

$$nz=k1*Z+k2*Vz$$

in which:

nz is the load factor of said airplane in the course of said capture phase;

k1 and k2 are negative constants dependent on the physical characteristics of said airplane;

Vz is the vertical speed of said airplane; and

Z is the current altitude level of said airplane with respect to said setpoint altitude.

Moreover, said modified vertical speed profile comprises a first part associated with a trajectory of said airplane of exponential type, followed by a second part associated with a trajectory of said airplane of parabolic type.

Said first part of said profile can advantageously be described with the aid of the following function:

$$f1(Z)=(a-Z)/(S_i+T)$$

in which:

a is an adjustment parameter dependent on said minimum and maximum execution deadlines;

Z is the current altitude level of said airplane with respect to said setpoint altitude;

$S_i$ is said predetermined threshold; and

T is a positive temporal margin with respect to said predetermined threshold $S_i$.

Furthermore, said second part of said profile can be defined with the aid of the following function:

$$f2(Z)=\sqrt{(\alpha*0.1g*Z)}$$

in which:

α is a constant equal to −1 when said airplane is in the climb phase and to 1 when it is in the descent phase;

g is the terrestrial gravitational constant; and

Z is the current altitude level of said airplane with respect to said setpoint altitude.

Moreover, the invention also relates to a device for the implementation of the method such as specified above making it possible to limit the number of alerts emitted by an anticollision system on board an airplane which performs a change-of-altitude maneuver comprising an approach phase followed by a phase of capture of a setpoint altitude associated with a predetermined setpoint execution deadline, said anticollision system being able to detect an intruder aircraft situated in the aerial environment of said airplane, to calculate a theoretical time for collision between said airplane and said intruder aircraft and to emit at least one alert when this theoretical collision time is less than a predetermined threshold.

According to the invention, such a device comprises:

means for determining at least one modified vertical speed profile associated with said altitude capture phase, so that the duration of the latter is between a predetermined minimum execution deadline and a predetermined maximum execution deadline;

activatable control means able to engage said altitude capture phase and to control the vertical speed of said airplane, so that it at least approximately follows said modified vertical speed profile; and activation means able to activate said control means, when said airplane is in the approach phase and is close to said setpoint altitude.

Furthermore, the device can comprise means for calculating an engagement altitude level for said altitude capture phase.

The invention also relates to an airplane provided with the device such as mentioned above.

BRIEF DESCRIPTION OF THE DRAWINGS

The figures of the appended drawing will elucidate the manner in which the invention may be embodied. In these figures, identical references denote similar elements.

DETAILED DESCRIPTION OF THE INVENTION

Figure 1:
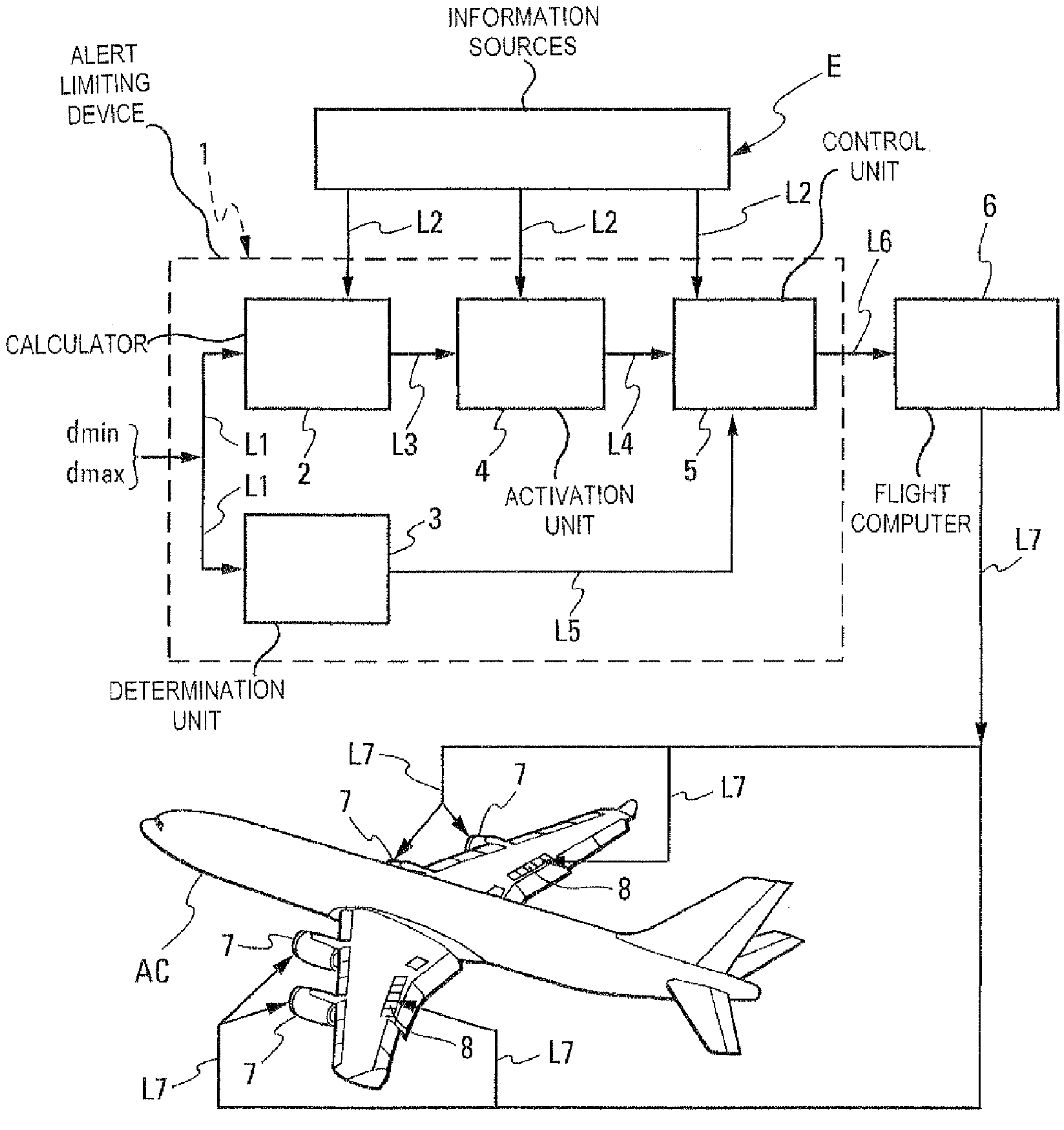
FIG. 1 represents, in schematic form, a device in accordance with the present invention making it possible to limit the alerts emitted by an anticollision system on board an airplane upon a change of altitude.

The device 1 in accordance with the invention and schematically represented in FIG. 1 is intended to limit the number of alerts emitted by a TCAS anticollision system (not represented) on board an airplane AC, when the latter performs a change-of-altitude maneuver to capture a setpoint altitude.

In FIG. 1, the device 1 and a set E of information sources are represented outside the airplane AC, although they are in reality on board the latter.

Figure 2A:
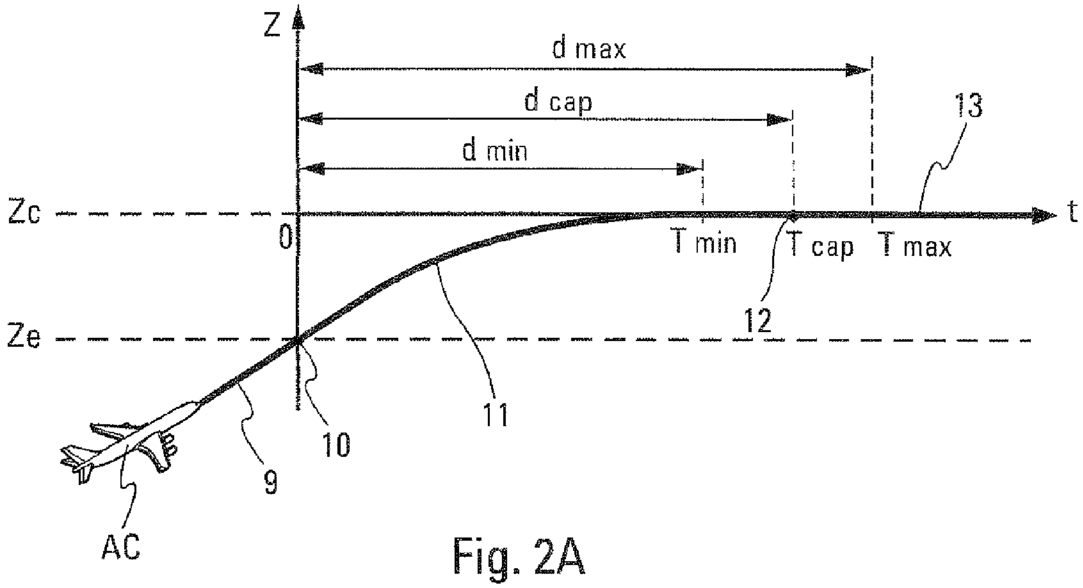
FIGS. 2A and 2B schematically illustrate an airplane during a change-of-altitude maneuver with capture of a setpoint altitude, in the climb phase (FIG. 2A) or descent phase (FIG. 2B), in accordance with the present invention.
Figure 2B:
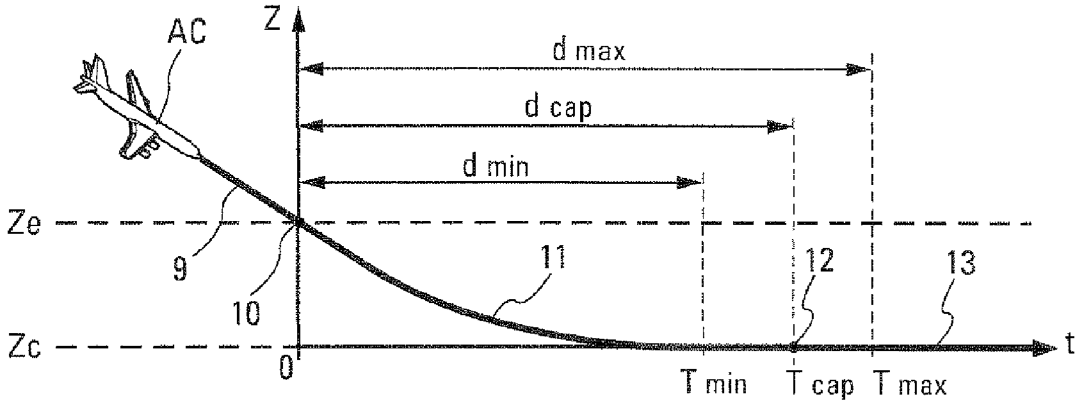

In a customary manner, the airplane AC is furthermore provided with an automatic pilot (not represented) able to control the change-of-altitude maneuver, which comprises in particular a capture phase (detailed in relation to FIGS. 2A and 2B). In particular, the automatic pilot is capable of determining a setpoint execution deadline for said capture phase, for example prior to the triggering of the change-of-altitude maneuver.

As shown by FIG. 1, in accordance with the invention, the device 1, which can be integrated into the automatic pilot of the airplane AC, comprises:

calculation means 2 for calculating an engagement altitude level for the altitude capture phase, said level being determined with respect to said setpoint altitude taken as reference. These calculation means 2 are able to receive, by way of the link L1, a desired maximum execution deadline and a desired minimum execution deadline for the altitude capture phase. Furthermore, with the aid of the set E of information sources, the calculation means 2 can receive, by way of the link L2, data relating to the airplane AC (for example its vertical speed, its current altitude level with respect to the setpoint altitude, etc.) and information specific to the anticollision system (for example the TA and RA alert thresholds defined previously);

determination means 3 for determining a modified vertical speed profile associated with said altitude capture phase.

These determination means 3 receive, by way of the link L1, said desired minimum and maximum execution deadlines and are able to determine a modified vertical speed profile allowing the airplane AC to reach the setpoint altitude before the end of the maximum execution deadline (tagged by Tmax in FIGS. 2A and 2B) but after the expiry of the minimum execution deadline (tagged by Tmin in FIGS. 2A and 2B);

activation means 4, connected to the calculation means 2 by way of the link L3. These activation means 4 also receive, by way of the link L2, data relating to the airplane AC originating from the set E. When engagement conditions (specified subsequently) are realized, these activation means 4 are able to activate control means 5; and the activatable control means 5, connected to the activation means 4 and to the determination means 3 by way respectively of the links L4 and L5. They furthermore receive, by way of the link L2, data representative of the state of said airplane AC originating from said set E. When they are activated by the activation means 4 (the engagement conditions are then realized), the control means 5 are able to engage the altitude capture phase and to determine the values of the load factor of the airplane AC allowing the vertical speed of the latter to follow said modified vertical speed profile. The load factor values obtained are transmitted to a flight computer 6 of the airplane AC.

The flight computer 6, connected in particular to the control means 5 of the device 1 by way of the link L6, is able to deliver control orders, by way of the links L7, for example to the actuators of the surfaces 8 for longitudinal control of the airplane AC (elevators, airbrakes) and/or to the engines 7 of said airplane, so as to apply the load factor values determined by the control means 5.

Schematically represented In FIGS. 2A and 2B is the airplane AC in the course of a change-of-altitude maneuver with capture of a setpoint altitude Zc, respectively while climbing (FIG. 2A) and while descending (FIG. 2B). As illustrated, the change-of-altitude maneuver comprises the following three successive phases:

a climb (or descent) approach phase, in the course of which the approach trajectory 9 of the airplane AC is substantially rectilinear and is traveled at substantially constant vertical speed Vzo up to an engagement altitude level Ze (point 10) situated below (or above) the setpoint altitude Zc to be reached;

an altitude capture phase, in the course of which the capture trajectory 11 of the airplane AC is rounded, and becomes tangential at 12 to the setpoint altitude Zc; and a stabilization phase, during which the trajectory 13 of the airplane AC follows said setpoint altitude Zc.

In the preferred realization, prior to the change-of-altitude maneuver, the pilots of the airplane AC determine a minimum execution deadline which is equal, for example, greater than the setpoint execution deadline, said setpoint deadline having been determined by the automatic pilot of the airplane AC and rendered accessible to the pilots by way, for example, of a control screen. The pilots furthermore determine a maximum execution deadline for the altitude capture phase so as to prevent the change-of-altitude maneuver from lasting too long.

Once the minimum and maximum execution deadlines have been determined by the pilots, the latter transmit them to the device 1, for example by means of an interface of keyboard type (not represented in FIG. 1).

As a variant, these minimum and maximum execution deadlines can be defined by a definitive pre-established adjustment and transmitted directly, by way of the link L1, to the device 1.

The calculation means 2 of the device 1 are formed in such a way as to calculate the engagement level Ze on the basis of the following formula:

$$Ze = a - (S_i + T) * Vzo$$

in which:

a is an adjustment parameter (the calculation of which is specified hereinafter) dependent on the minimum and maximum execution deadlines of said capture phase;

$S_i$ is said predetermined alert threshold;

T is a positive temporal margin with respect to said predetermined threshold $S_i$; and Vzo is the, substantially constant, vertical speed of the airplane AC in the course of said approach phase.

Depending on whether one seeks to reduce the number of RA alerts and/or of TA alerts, the threshold $S_i$ may be chosen equal respectively to the threshold $S_{RA}$ of RA alerts or to the threshold $S_{TA}$ of TA alerts.

Furthermore, the determination means 3 are able to determine a modified vertical speed profile associated with said capture phase. A modified vertical speed profile such as this comprises a first part associated with a trajectory of the airplane AC of exponential type, followed by a second part associated with a trajectory of the airplane AC of parabolic type at 0.05g, completing the capture phase.

The expression modified vertical speed profile associated with the capture trajectory 11 is understood to mean a set of values of vertical speed corresponding to a set of altitude levels of the airplane AC along this trajectory 11.

Furthermore, the function f describing the modified vertical speed profile satisfies the following conditions:

f(Zc)=0 (Zc being the reference altitude of the altitude levels, we have Zc=0);

$|f(Z) \cdot f'(Z)| < 0.05g$, in which f' is the derivative of f with respect to the current altitude level Z of the airplane AC and g is the terrestrial gravitational constant;

$f'(Z) \leqq 0$; and $$\int_{Ze}^{0} \frac{dZ}{f(Z)}$$

in which $$d\min \langle \int_{Ze}^{Zc=0} \frac{dZ}{f(Z)} \langle d\max$$

corresponds to the desired duration dcap of the capture phase.

Thus, when the airplane AC is climbing (FIG. 2A), the function f describing the modified vertical speed profile is defined, as a function of the current altitude level Z of the airplane AC, as the lower of the following two functions:

the function $f1(Z) = (a - Z)/(S_i + T)$ of said modified vertical speed profile associated with a trajectory of the airplane AC of exponential type; and the function $f2(Z) = \sqrt{(-0.1g * Z)}$ of said modified vertical speed profile associated with a trajectory of the airplane AC of parabolic type at 0.05g.

In the case where the airplane AC is descending (FIG. 2B), the function f describing the vertical speed profile is defined, as a function of the current altitude level Z of the airplane AC, as the higher of the two functions f1 and f2', with $f2'(Z)=\sqrt{(0.1g*Z)}$.

Thus, assuming that the capture phase is completed at the instant Tcap equal to the mean (Tmin+Tmax)/2 (that is to say dcap=(dmin+dmax)/2), it is possible to use the following equation (obtained on the basis of the formula for dcap specified above) to determine the adjustment parameter a:

$$(S_i+T)\left(4-4\sqrt{1-\frac{2a}{0.05g(S_i+T)^2}}+\ln\left(\frac{0.2g(S_i+T)}{|Vzo|}\sqrt{1-\frac{2a}{0.05g(S_i+T)^2}}\right)\right)=\frac{d\min+d\max}{2}$$

For performance reasons, the values of the parameter a obtained by solving this equation are preferably restricted to the interval [0; 300 m] (i.e. [0; 1000 feet]).

It should be noted that, when the airplane AC is descending (FIG. 2B), the values obtained of the adjustment parameter a must be multiplied by −1.

Moreover, the control means 5 are activated by the activation means 4 when the following engagement conditions are simultaneously satisfied:

- the airplane AC is following the climb trajectory 9 (FIG. 2A) or descent trajectory (FIG. 2B) of the approach phase, in the course of which its vertical speed Vzo is substantially constant; and
- the current altitude level Z of the airplane AC is between the setpoint altitude Zc and the engagement altitude level Ze previously determined.

Once activated (the engagement conditions are realized), the control means 5 are able to engage the altitude capture phase.

Furthermore, these control means 5 determine the values of the load factor nz of the airplane AC along the capture trajectory 11 so as to transmit them to the flight computer 6, so that the vertical speed of said airplane AC at least approximately follows the modified vertical speed profile, previously determined by the determination means 3.

In the course of the capture phase, said load factor nz is of the proportional type and defined by the following formula:

$$nz=k*(Vz-f(Z))$$

in which:

- k is a negative constant dependent on the physical characteristics of the airplane AC;
- Vz is the vertical speed of the airplane AC; and
- f is the function describing the modified vertical speed profile of the airplane AC as a function of the current altitude level Z of the latter.

On the basis of the load factor values received, the flight computer 6 can deliver control orders intended, for example, to control the actuators of the surfaces 8 for longitudinal control and/or the engines 7 of the airplane AC.

In the case where the setpoint altitude Zc is not reached before the end instant Tmax (for example because of turbulence), the mode of determining the load factor of the airplane AC is changed and becomes of proportional derivative type.

The load factor nz is then defined by the following formula:

$$nz=k1*Z-k2*Vz$$

in which k1 and k2 are negative constants whose values are determined by adjustment as a function of the characteristics of the airplane AC.

The invention claimed is:

1. A method for limiting alerts emitted by an anticollision system on board an airplane which performs a change-of-altitude maneuver, wherein the change-of-altitude maneuver of the airplane is carried out during a flight trajectory of the airplane in which the flight trajectory comprises an approach phase followed by a capture phase, with the flight trajectory having a setpoint altitude (Zc) and the capture phase having a predetermined setpoint execution deadline, the method comprising the steps of:

detecting, by said anticollision system, an intruder aircraft situated in an aerial environment of said airplane;

calculating a theoretical time for collision between said airplane and said intruder aircraft; and emitting at least one alert when the calculated theoretical collision time is less than a predetermined threshold, wherein the following steps are additionally carried out by an alert limiting device:

A) determining a minimum execution deadline (dmin) and a maximum execution deadline (dmax) of said capture phase, said minimum execution deadline (dmin) being greater than said predetermined setpoint execution deadline;

B) calculating at least one modified vertical speed profile of said altitude capture phase, wherein the at least one modified speed profile provides for a flight duration (dcap) in the altitude capture phase of the flight trajectory that is between said minimum (dmin) and maximum (dmax) execution deadlines;

C) triggering, when said airplane is in the approach phase, said capture phase; and D) controlling, after said capture phase is triggered, vertical speed of said airplane according to said calculated modified vertical speed profile.

2. The method as claimed in claim 1, further comprising the steps of:

calculating an engagement altitude level (Ze) for said capture phase; and triggering the capture phase when the current altitude level of said airplane is between said engagement altitude level (Ze) and said setpoint altitude (Zc).

3. The method as claimed in claim 2, wherein said engagement altitude level (Ze) is determined according to the following formula:

$$Ze=a-(S_i+T)*Vzo$$

in which:

Vzo is a substantially constant vertical speed of said airplane in the course of said approach phase;

a is an adjustment parameter dependent on said minimum (dmin) and maximum (dmax) execution deadlines;

$S_i$ is said predetermined threshold; and

T is a positive temporal margin with respect to said predetermined threshold $S_i$.

4. The method as claimed in claim 1, wherein, during the capture phase, said control of the vertical speed of said airplane is performed by controlling a load factor of said airplane defined according to the following formula:

$$nz=k*(Vz-f(Z))$$

in which:

nz is the load factor of said airplane in capture phase;

k is a negative constant dependent on physical characteristics of said airplane;

Vz is the vertical speed of said airplane; and f represents said modified vertical speed profile as a function of a current altitude level Z of said airplane with respect to said setpoint altitude (Zc).

5. The method as claimed in claim 1, wherein, said control of the vertical speed of said airplane is controlled by controlling, prior to reaching said set point altitude (Zc) and after exiry of said maximum execution deadline (dmax), a load factor of said airplane according to the following formula:

$$nz=k1*Z+k2*Vz$$

in which:

nz is the load factor of said airplane in the course of said capture phase;

k1 and k2 are negative constants dependent on the physical characteristics of said airplane;

Vz is the vertical speed of said airplane; and

Z is the current altitude level of said airplane with respect to said setpoint altitude (Zc).

6. The method as claimed in claim 1, wherein said modified vertical speed profile comprises a first part comprised of an exponential trajectory of said airplane, followed by a second part comprised of a parabolic trajectory of said airplane.

7. The method as claimed in claim 6, wherein said first part of said modified vertical speed profile is carried out according to the following function:

$$f1(Z)=(a-Z)/(S_i+T)$$

in which:

a is an adjustment parameter dependent on said minimum (dmin) and maximum (dmax) execution deadlines;

Z is a current altitude level of said airplane (AC) with respect to said setpoint altitude (Zc);

$S_i$ is said predetermined threshold; and

T is a positive temporal margin with respect to said predetermined threshold $S_i$.

8. The method as claimed in claim 7, wherein said second part of said modified vertical speed profile is carried out according to the following function:

$$f2(Z)=\sqrt{(\alpha*0.1g*Z)}$$

in which:

$\alpha$ is a constant equal to −1 when said airplane is in a climb phase and equal to 1 when said airplane is in a descent phase;

g is a terrestrial gravitational constant; and

Z is the current altitude level of said airplane with respect to said setpoint altitude (Zc).

9. An alert limiting device for limiting alerts emitted by an anticollision system on board an airplane which performs a change-of-altitude maneuver, wherein the change-of-altitude maneuver of the airplane is carried out during a flight trajectory of the airplane in which the flight trajectory comprises an approach phase followed by a capture phase, with the flight trajectory having a setpoint altitude (Zc) and a predetermined setpoint execution deadline for the capture phase, wherein said anticollision system is configured:

to detect an intruder aircraft situated in an aerial environment of said airplane, to calculate a theoretical time for collision between said airplane and said intruder aircraft and to emit at least one alert when the calculated theoretical collision time is less than a predetermined threshold, which device comprises:

determination unit configured to determine at least one modified vertical speed profile of said altitude capture phase, wherein the at least one modified vertical speed profile provides for a flight duration (dcap) in the altitude capture phase of the flight trajectory that is between a predetermined minimum execution deadline (dmin) and a predetermined maximum execution deadline (dmax);

activatable control unit configured to engage said altitude capture phase and to control vertical speed of said airplane according to said modified vertical speed profile; and activation unit configured to activate said activatable control unit when said airplane is in the approach phase.

10. An airplane, which comprises the device of claim 9.

* * * * *